US009208174B1

(12) United States Patent
Ballagh et al.

(10) Patent No.: US 9,208,174 B1
(45) Date of Patent: Dec. 8, 2015

(54) NON-LANGUAGE-BASED OBJECT SEARCH

(75) Inventors: Jonathan B. Ballagh, Boulder, CO (US); Thomas E. Fischaber, Golden, CO (US); Roger B. Milne, Boulder, CO (US); Krista M. Marks, Boulder, CO (US); Theodore J. Stroomer, Lafayette, CO (US)

(73) Assignee: Disney Enterprises, Inc., Burbank, CA (US)

( * ) Notice: Subject to any disclaimer, the term of this patent is extended or adjusted under 35 U.S.C. 154(b) by 1051 days.

(21) Appl. No.: 11/942,484

(22) Filed: Nov. 19, 2007

Related U.S. Application Data

(60) Provisional application No. 60/866,466, filed on Nov. 20, 2006.

(51) Int. Cl.
*G06F 3/048* (2013.01)
*G06F 17/30* (2006.01)

(52) U.S. Cl.
CPC ...... *G06F 17/30268* (2013.01); *G06F 17/3028* (2013.01); *G06F 17/30277* (2013.01)

(58) Field of Classification Search
CPC ............. G06F 17/30265; G06F 17/30268; G06F 17/30274; G06F 17/30277; G06F 17/3028
USPC .......... 715/810–845, 853–855; 707/731, 749, 707/778
See application file for complete search history.

(56) References Cited

U.S. PATENT DOCUMENTS

| | | | | |
|---|---|---|---|---|
| 4,931,783 | A | | 6/1990 | Atkinson |
| 5,515,496 | A | | 5/1996 | Kaehler |
| 5,583,763 | A | * | 12/1996 | Atcheson et al. ............. 707/750 |
| 5,592,605 | A | * | 1/1997 | Asuma et al. ................. 715/775 |
| 5,749,081 | A | * | 5/1998 | Whiteis |
| 5,754,179 | A | * | 5/1998 | Hocker et al. ................ 715/835 |
| 5,835,087 | A | * | 11/1998 | Herz et al. .................... 715/810 |
| 5,986,670 | A | * | 11/1999 | Dries et al. ................... 345/629 |
| 6,076,051 | A | * | 6/2000 | Messerly et al. ................. 704/9 |
| 6,137,911 | A | * | 10/2000 | Zhilyaev ................. G06K 9/62 345/440 |
| 6,138,123 | A | * | 10/2000 | Rathbun |
| 6,141,010 | A | * | 10/2000 | Hoyle .......................... 715/854 |
| 6,182,069 | B1 | * | 1/2001 | Niblack et al. |
| 6,204,840 | B1 | * | 3/2001 | Petelycky et al. ............. 715/202 |
| 6,345,274 | B1 | * | 2/2002 | Zhu et al. |
| 6,359,635 | B1 | * | 3/2002 | Perttunen ...................... 715/834 |
| 6,363,378 | B1 | * | 3/2002 | Conklin et al. |
| 6,389,418 | B1 | * | 5/2002 | Boyack et al. |
| 6,434,556 | B1 | * | 8/2002 | Levin et al. |
| 6,438,579 | B1 | * | 8/2002 | Hosken ......................... 709/203 |
| 6,801,229 | B1 | * | 10/2004 | Tinkler ......................... 715/853 |

(Continued)

*Primary Examiner* — Amy Ng
*Assistant Examiner* — William Wong
(74) *Attorney, Agent, or Firm* — Farjami & Farjami LLP

(57) ABSTRACT

Disclosed are various approaches for searching for electronic information. In one embodiment, a first plurality of objects is presenting for user selection. The first plurality of objects is a first subset of a second plurality of objects that is organized by a plurality of containment categories in a data structure. A plurality of associations is stored, and each association defines a relationship between one of, two different ones of the plurality of categories, or two objects in two different ones of the plurality of containment categories. In response to user selection of one of the first plurality of objects, a second subset of the second plurality of objects is selected. Selection of the objects in the second subset is in part a function of respective weighted relevance values for associations of the selected object to each of the second plurality of objects. The second subset of objects is output.

20 Claims, 15 Drawing Sheets

(56) References Cited

U.S. PATENT DOCUMENTS

| | | | |
|---|---|---|---|
| 6,813,618 B1* | 11/2004 | Loui et al. | |
| 6,819,345 B1 | 11/2004 | Jones | |
| 6,829,615 B2* | 12/2004 | Schirmer et al. | |
| 6,868,525 B1* | 3/2005 | Szabo | 715/738 |
| 6,931,604 B2* | 8/2005 | Lane | 715/853 |
| 6,961,910 B2* | 11/2005 | Lee et al. | 715/853 |
| 6,983,426 B1* | 1/2006 | Kobayashi et al. | 715/854 |
| 7,043,702 B2* | 5/2006 | Chi et al. | 715/853 |
| 7,062,722 B1* | 6/2006 | Carlin | G06T 15/10 715/781 |
| 7,093,200 B2* | 8/2006 | Schreiber et al. | 715/835 |
| 7,228,507 B2* | 6/2007 | Good et al. | 715/778 |
| 7,249,126 B1* | 7/2007 | Ginsburg et al. | 707/749 |
| 7,313,766 B2* | 12/2007 | Kautto Kiovula et al. | 715/853 |
| 7,327,347 B2* | 2/2008 | Hilbert et al. | 345/156 |
| 7,432,940 B2* | 10/2008 | Brook et al. | 345/629 |
| 7,814,085 B1* | 10/2010 | Pfleger et al. | 707/708 |
| 2001/0049688 A1* | 12/2001 | Fratkina et al. | 707/104.1 |
| 2002/0054115 A1* | 5/2002 | Mack et al. | 345/765 |
| 2002/0059599 A1* | 5/2002 | Schein et al. | 725/39 |
| 2002/0080180 A1* | 6/2002 | Mander et al. | 345/769 |
| 2003/0001900 A1* | 1/2003 | Cabanes et al. | 345/810 |
| 2003/0016250 A1* | 1/2003 | Chang et al. | 345/810 |
| 2003/0117432 A1* | 6/2003 | Kautto-Kiovula et al. | 345/735 |
| 2003/0123737 A1* | 7/2003 | Mojsilovic | G06F 17/30247 382/224 |
| 2003/0160824 A1* | 8/2003 | Szumla | 345/769 |
| 2003/0182310 A1* | 9/2003 | Charnock et al. | 707/104.1 |
| 2003/0195883 A1* | 10/2003 | Mojsilovic et al. | 707/6 |
| 2004/0024739 A1* | 2/2004 | Copperman et al. | 707/1 |
| 2004/0036716 A1* | 2/2004 | Jordahl | 345/713 |
| 2004/0090472 A1* | 5/2004 | Risch et al. | 345/853 |
| 2004/0172593 A1* | 9/2004 | Wong et al. | 715/512 |
| 2004/0177319 A1* | 9/2004 | Horn | 715/501.1 |
| 2004/0215657 A1* | 10/2004 | Drucker et al. | 707/104.1 |
| 2005/0004819 A1* | 1/2005 | Etzioni et al. | 705/5 |
| 2005/0022121 A1* | 1/2005 | Nies et al. | 715/526 |
| 2005/0044508 A1* | 2/2005 | Stockton | 715/811 |
| 2005/0091596 A1* | 4/2005 | Anthony et al. | 715/712 |
| 2005/0111737 A1* | 5/2005 | Das et al. | 382/190 |
| 2005/0132304 A1* | 6/2005 | Guido et al. | 715/853 |
| 2005/0154607 A1* | 7/2005 | Terzidis et al. | 705/1 |
| 2006/0047584 A1* | 3/2006 | Vaschillo et al. | 705/27 |
| 2006/0053382 A1* | 3/2006 | Gardner et al. | 715/764 |
| 2006/0074870 A1 | 4/2006 | Brill | |
| 2006/0078201 A1* | 4/2006 | Kim | G06F 17/30256 382/181 |
| 2006/0139461 A1* | 6/2006 | Matsui et al. | 348/231.2 |
| 2006/0156253 A1* | 7/2006 | Schreiber et al. | 715/835 |
| 2006/0225000 A1* | 10/2006 | Albrecht et al. | 715/853 |
| 2006/0271883 A1* | 11/2006 | Bier et al. | 715/853 |
| 2007/0033220 A1* | 2/2007 | Drucker et al. | 707/103 R |
| 2007/0159477 A1* | 7/2007 | Schrag et al. | 345/419 |
| 2007/0162854 A1* | 7/2007 | Kikinis | 715/719 |
| 2007/0233678 A1* | 10/2007 | Bigelow | 707/6 |
| 2007/0271524 A1* | 11/2007 | Chiu et al. | 715/767 |
| 2008/0046840 A1* | 2/2008 | Melton et al. | 715/825 |
| 2008/0118151 A1* | 5/2008 | Bouguet et al. | 382/181 |

* cited by examiner

NON-LANGUAGE-BASED OBJECT SEARCH

RELATED PATENT DOCUMENTS

This patent document claims the benefit, under 35 U.S.C. §119(e), of U.S. Provisional Patent Application No. 60/866,466, filed Nov. 20, 2006 and entitled: "NON-LANGUAGE-BASED OBJECT SEARCH" which is fully incorporated herein by reference.

TECHNICAL FIELD

The present invention relates generally to data searching, and more particularly to systems and methods for automatically selecting related objects or other search results generated in response to manipulation of visually displayed objects or other interface components and/or user intentions.

BACKGROUND

Many of today's computers are accessible through graphical user interfaces (GUIs). The use of GUIs has greatly increased the usability of computers for the general population and has greatly enhanced the role computers play in everyday life. Over time, the application software available to computer users has become increasingly complex, with an increasing number of capabilities, options, and resources presented to users of each class of software application, of which the class of word-processing software applications may be considered as an example. A problem that tends to accompany any increase in capabilities, options, or resources in a software application is that it generally becomes more difficult for the user to find and operate the new capabilities, options, or resources.

Software designers have responded to such problems and challenges generally by adding help and search capabilities to the software. These allow the user to search for specific software features or resources that they wish to utilize. There are several deficiencies in the conventional help and search based mechanisms. Current mechanisms often rely on written communication of ideas between the user and the software, and this presupposes that the user is able to read and write (and type) a language used by the software. These mechanisms generally require the user to understand the nature of search and queries as implemented by software components, often in terms of Boolean logic. Users are generally required to understand specific terminology and concepts used by the designers of the software application. These mechanisms also generally require the user to switch tasks (e.g. between working on a task and searching for how to accomplish a subtask and learning about a software application), and often require the user to switch between a pointer (e.g. mouse) based task such as the assembly of a figure and a keyboard based task such as searching for components related to ones they have already assembled.

In addition to increasing application complexity, the need for improved searching techniques has grown in recent years due to the much increased volume of information available to computer applications and computer users. The availability of information has grown most significantly because of the increased sharing of information amongst computers and computer users.

In recent years, there has been a tremendous proliferation of computers connected to a global network known as the Internet. A "client" computer connected to the Internet can download digital information from "server" computers connected to the Internet. Client application software executing on client computers typically accepts commands from a user and obtains data and services by sending requests to server applications running on server computers connected to the Internet. A number of protocols are used to exchange commands and data between computers connected to the Internet. The protocols include the File Transfer Protocol (FTP), and the Hypertext Transfer Protocol (HTTP).

The HTTP protocol is used to access data on the World Wide Web, often referred to as "the Web." The World Wide Web is an information service on the Internet providing documents and links between documents. The World Wide Web is made up of numerous Web sites around the world that maintain and distribute electronic documents. A Web site may use one or more Web server computers that store and distribute documents in one of a number of formats including the Hypertext Markup Language (HTML). An HTML document contains text and metadata or commands providing formatting information. HTML documents also include embedded "links" that reference other data or documents located on any Web server computers. The referenced documents may represent text, graphics, audio, or video in respective formats.

A Web browser is a client application or operating system utility that communicates with server computers via FTP, HTTP, and/or other protocols. Web browsers receive electronic documents from the network and present those documents to a user. FIREFOX™, which is available from the Mozilla Foundation and INTERNET EXPLORER®, which is available from Microsoft Corporation, of Redmond, Wash., are examples of popular Web browser applications.

In addition to data and metadata, HTML documents can contain embedded software components containing program code that perform a wide variety of operations. These software components expand the interactive ability of an HTML document's user interface. The components can perform other operations, such as manipulating data and playing audio or video clips. ActiveX is a specification developed by Microsoft Corporation for creating software components that can be embedded into an HTML document. JAVA™ is a well-known programming language that can be used to develop components called "applets," which are transmitted with HTML documents from Web servers to client computers. JAVASCRIPT™ and VBScript are scripting languages that are also used to extend the capabilities of HTML. JAVASCRIPT and VBScript scripts are embedded in HTML documents. A browser executes each script as it reaches the position in the script during interpretation of the HTML document. Scripts loaded during interpretation of the document may modify the document if the browser supports dynamic HTML (DHTML). Scripts may respond to user activity (pointer events or keyboard events), may post data to the server, and may request and receive data from the server. They may schedule additional scripts to execute upon the receipt of certain requested data from the server, allowing for asynchronous, data-driven events to occur.

The use of query graphs to facilitate search, and, in particular, the presentation of such query graphs in a user interface so as to allow the user to navigate a graph of potential search queries has been proposed as a mechanism to partly alleviate some difficulties users may face in constructing appropriate query strings. Query graphs do not, however, alleviate the need for users to understand the query mechanism or details regarding the search component. A query graph may require a user to become more familiar with the inner structure of the search component, while at the same time providing the user with a richer search capability in certain usage scenarios. In addition, a query graph does not alleviate others of the search-related difficulties cited above, including those of language barriers and task switching.

Many, if not most, search applications in the current art are text (language) based; they are driven by and respond to textual queries. This is true both for active search applications in which the user enters specific search queries (e.g., the GOOGLE™ search application, from Google, Inc., of Sunnyvale Calif.), for various categorized electronic data sources (e.g., the YAHOO!™ Web directory, and the WIKIPEDIA® on-line encyclopedia from the Wikimedia Foundation) and for passive search applications which monitor user activities and report relevant search results (e.g., Watson contextual search software, from Media River, Inc.). At the same time, a growing amount of computer-user interaction and content retrieved by users through computer interaction is non-text-based and/or non-language-based. This is true in GUIs for desktop components and sub-components, as illustrated by the increased use of icons to represent resources, applications, and actions within applications. It is also true for content retrieved, stored, and accessed through computers, with increased user interest in content in the form of music, images, or video.

There is therefore a need, not met by the current art, for new methods and mechanisms for search that are not language based.

SUMMARY

The invention provides various embodiments for searching for electronic information. In one embodiment, a first plurality of objects is presenting for user selection. The first plurality of objects is a first subset of a second plurality of objects that is organized by a plurality of containment categories in a data structure. A plurality of associations is stored, and each association defines a relationship between one of, two different ones of the plurality of categories, or two objects in two different ones of the plurality of containment categories. In response to user selection of one of the first plurality of objects, a second subset of the second plurality of objects is selected. Selection of the objects in the second subset is in part a function of respective weighted relevance values for associations of the selected object to each of the second plurality of objects. The second subset of objects is output.

These and other features, objects, and benefits of the invention will be best understood by those skilled in the art by reading the Detailed Description of the invention in conjunction with the drawings which are first described briefly below.

BRIEF DESCRIPTION OF THE DRAWINGS

The foregoing aspects and many of the attendant advantages of this invention will become more readily appreciated with reference to the Detailed Description in conjunction with the accompanying drawings, wherein.

DETAILED DESCRIPTION

Figure 1:
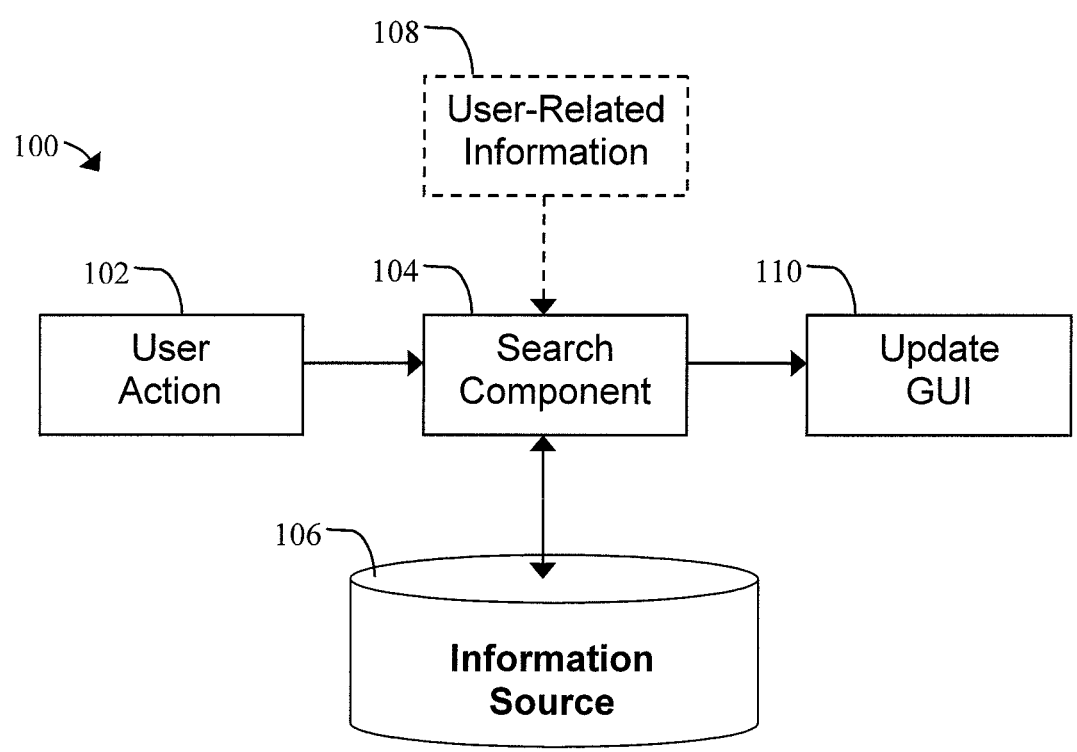
FIG. 1 is a block diagram of a search system and user interface in accordance with one or more embodiments of the present invention.

The various embodiments of the present invention leverage object associations and taxonomies to facilitate a user in locating desired objects without requiring the user to enter or otherwise select queries based on a written or spoken language and without requiring the user to understand the nature of specific mechanisms for object search, whether query-based or otherwise. In one embodiment, object search may be automatically triggered based on user activity and manipulation of other available objects. Some object associations and taxonomies may be established a priori as part of an embodiment of the invention. Additional object associations may be established through user interactions with objects or sequences of user interactions with objects, and these associations may be used for future search actions by the same user or by other users. Thus, the embodiments of the invention provide new methods and mechanisms for identifying and displaying objects to a user based on the user's interactions and use of previously displayed objects in a manner that infers the user's intent and anticipates future interest in related objects.

The embodiments of the present invention are now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing embodiments of the invention.

As used in this description, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be considered a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the specific set of data subject to change and associated with the execution of the thread. A thread's context includes the contents of system registers and the virtual address belonging to the thread's process. Thus, the actual data comprising a thread's context varies as it executes.

The various embodiments of the invention relate generally to object searching, and more particularly to systems and methods for automatically deriving and presenting relevant content to users without requiring those users to provide or to understand language-based (written or spoken) query methods.

For basic understanding, it may be useful to consider a basic embodiment as applied to an example application. The application is to a software system in which children are able to assemble a scene, suitable for printing and artwork-coloring, from a variety of objects. These objects could include such things as graphical representations of houses, dogs, people, teapots, birds, sea shells, boats, airplanes, the sun, etc. In this software system, a vast number of objects could be of interest to any particular user in the construction of any particular scene. Also, significantly, the users may be unable, and even in the case that they are able, uninterested, in searching for objects to add to a scene through a language-based or text-based query mechanism. The embodiments of the invention are also applicable to constructing figure or diagrams, and also to applications in the style of constructing traditional stamp book scenes. The need for a mechanism beyond those currently in the art is clear in this context. It will also become clear that the various embodiments of the invention satisfy this need.

To facilitate object searching in the foregoing context, embodiments of the invention may operate and be constructed as follows. In a graphical scene construction software program, graphical objects are added and removed in composing a graphical scene. This tool may include a palette of graphical objects from which a user may select one or more objects to add to the scene. First, whenever the user adds a new object to a scene, e.g. a graphical representation of a dog, an embodiment of the invention may be used to select related objects for presentation to the user. The system can then allow the related objects to be added to the scene as well. Examples of objects related to the graphical representation of the dog could include graphical representations of such things as dog bones, dog houses, cats, etc., as well as other graphical representations of the same dog, similar dogs, or dissimilar dogs. The user may also be allowed to search, and benefit from this search method, without adding objects to the scene. Instead the user could select objects of interest or that are associated with objects of interest and be presented with other objects of interest. This selection could be done, for example, through pointer-based selection (e.g., mouse button press) of an icon that represents the first object.

One embodiment of the present invention allows such associated objects to be selected automatically by use of object classifications, taxonomies, and associations between objects or object classifications. In the foregoing context, object classifications could include such classes as dogs, animals, pets, young animals, the family canidae, vehicles, astronomical bodies, objects associated with friendship, objects associated with laziness, etc. Some classifications may form taxonomies (e.g., family canidae—genus *canus*, or astronomical bodies—stars). Those skilled in the art will appreciate that a traditional method of traversing a taxonomy may involve search queries seeking a specific item or object. A traditional method may also involve the exclusion of certain items or objects during the process of iteration. In an embodiment of the present invention, a search may be performed without seeking a specific item or object and without the exclusion of items during the process of iteration. Instead, associations between objects or classes and various other metrics and methods may be used to perform the automatic selection of associated objects.

Objects or classes may be given attributes in one or more embodiments of the present invention. An association—a metric signifying a relationship between a combination of objects and categories—is an example of an attribute. An attribute may be any metric assigned to specific objects or classes and used to distinguish between them.

A diversity region is another example of an attribute. Diversity regions may be used as selection metrics to ensure the diversity of objects selected to be placed in the tool palette. Categories may be tagged with diversity regions such that all objects within a category and all categories contained beneath the category are assigned the same diversity region. In this way, a diversity region may be used to aid in the traversal of a taxonomy of categories without modifying the categorical structure itself.

A relative weighting for strength of association is yet another example of an attribute. In one embodiment of the present invention, such a weighting may be described as an attribute of an object or object classification that gives a weighted relevance to a particular setting. In the context chosen for illustration, an example of such a setting could be a fixed background that has been selected for a particular scene. Choice by the user of this background may establish a setting in which particular objects or object classifications become more or less relevant. For example, if the scene background is a beach scene, a graphical representation of a seashell may be assigned high relevance while a graphical representation of a teapot may be assigned low relevance.

A number of additional metrics may also be used in determining the relevance of associated objects. Some degree of randomization is one such metric. Data about a user, stored either on that user's computer or on a web server, is another such metric; previous object selections made by the user may be used to determine current object relevance, as may explicit preferences set by the user or the user's proxy.

Metrics related to third-party interests, such as those from advertisers, may also be incorporated into a determination of object relevance. Data from a body of users might show that images of certain brand name products have increased appeal to identifiable sub-groups of users, and this data's influence upon object relevance can be used to effect targeted advertising. Data from a body of users could be used in other ways as well in determining relevance. The objects that users of a particular age or gender frequently select is an example of such data. An object's popularity, dependent on or independent of the objects previously selected, might also be used for determination.

In FIG. 1, a block diagram of a search system and interface 100 in accordance with one or more embodiments of the present invention is shown. The search system and interface 100 is comprised of a component which monitors and processes user actions 102 and a search component 104 that receives an input from user action 102. The search component 104 interfaces with an information source 106 to provide information related to the input 102. Search component 104 may also provide new information to the information source 106 in regards to recent user actions and from object associations that search component 104 or the front-end processor 102 infer from a sequence of two or more user actions. Search component 104 may use the information obtained from the information source 106 to establish one or more lists of objects that are associated with recent user actions as may be reported by the front-end 102. Search component 104 may also interface with optional user-related information 108 to refine such lists of objects. The user-related information 108 may include, but is not limited to, preferences set by the user, preferences of the user that are inferred by the system from the history of interactions between the user and the system, or parental controls set by the user's parent or guardian. The user may or may not be aware of the presence of user-related information 108 in the system, and, indeed, such user-related information may or may not be present in particular embodiments of the invention as described. The search component 104 may provide its lists of objects to a component 110, which manages updates to the graphical user interface (GUI) that is interacted with by the user. This component 110 may make use of the lists of objects generated by search component 104 to make changes to the GUI and, in doing so, may make new and useful content available to the user.

Figure 2:
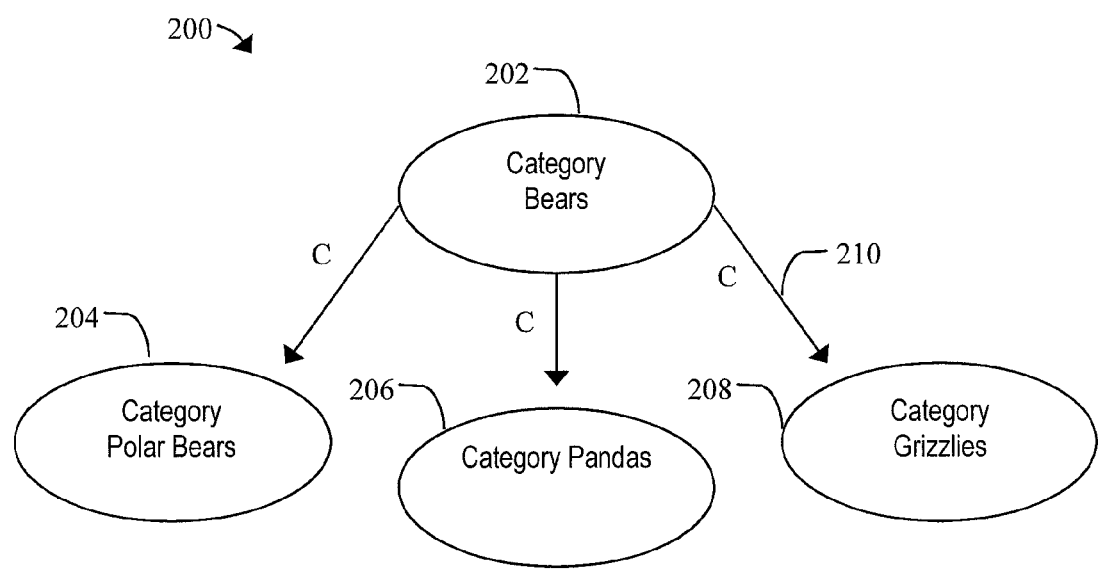
FIG. 2 shows a directed graph having an example category and contained sub-categories.

In FIG. 2, an example directed graph 200 is shown. Such a directed graph may be used in an embodiment of the present invention in the selection of related objects. The graph 200 contains a portion of a categorical taxonomy. Those skilled in the art will realize that in such taxonomies, general categories such as category bears 202 may utilize containment and/or containment edges such as containment edge 210, whereby one category encompasses some number of others. For example, category bears 202 might contain more specific categories such as category polar bears 204, category pandas 206, and category grizzlies 208. Categories contained within the same general category might be used as selection criteria when using such a graph. Those skilled in the art will understand that directed acyclic graphs may generally be used to represent categorical taxonomies as illustrated in FIG. 2.

Containment edge 210 highlights one possible use of a containment edge in a directed graph as shown in FIG. 2. Those skilled in the art will realize that a directed graph or a multiplicity of directed graphs may utilize edges (either containment edges or association edges, see also FIG. 4) between its members or categories to store information about the relationships between those members or categories. Those skilled in the art will also realize that a given edge may have a target and a source. For example, in FIG. 2, containment edge 210 (by convention indicated with a IC') points to category grizzlies 208 as its target (by convention, the target of an edge is indicated using an arrow pointing towards the target). Containment edge 210 also touches category bears 202 but does not display an arrow pointing towards bears 202, indicating that category bears 202 is its source. Hardware or software, such as the software used in one embodiment of the present invention, can examine the containment edges in a directed or similar graph to determine which categories (the sources of those edges) contain other categories (the targets of those edges). Containment edges may thus be used in the selection of new objects and are used as such in an embodiment of the present invention.

Figure 3:
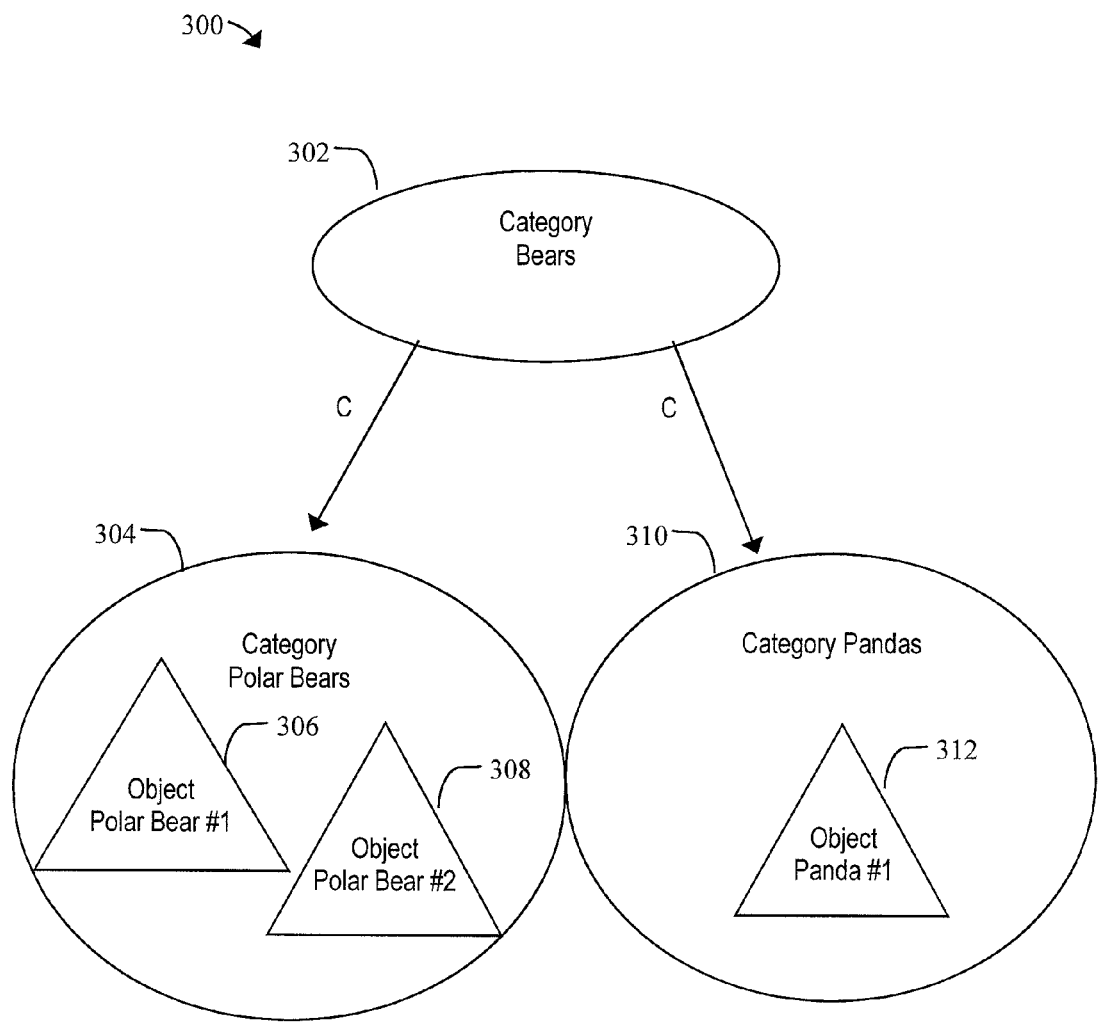
FIG. 3 shows a directed graph having an example category in which a categorical taxonomy also contains references to individual objects.

FIG. 3 illustrates an example context in which a directed graph and/or a categorical taxonomy may also contain references to individual objects. As in FIG. 2, the directed graph 300 in FIG. 3 utilizes the containment of specific categories by general categories. FIG. 3 also demonstrates, however, that specific categories such as category polar bears 304 or category pandas 310 may contain, for example, objects polar bear #1 (306), polar bear #2 (308), or panda #1 (312). Objects contained within the same category or related categories might be selected using such a graph 300. In certain embodiments of the invention, the contained objects may be graphical or iconic representations of real world or computer application objects. Images, photographic images, sketches, and cartoon renderings may also be used for the contained objects, for example.

In various embodiments of the present invention, it may be desirable to facilitate the selection of objects that are related to a given object without being taxonomically related to that object. It may be desirable for the graphical representation of a Dalmatian to trigger the selection of the graphical representations of other dogs, but it may also be desirable to trigger the selection of bones, fire hydrants, leashes, and other spotted animals, for example. Those skilled in the art will realize that a categorical taxonomy, by itself, might only allow for the selection of similar objects. A system of associations between objects or categories is one way to overcome this limitation in embodiments of the present invention. Such associations may also introduce an alternative method of traversing a categorical taxonomy; those skilled in the art will also appreciate that such associations will allow users to more quickly navigate the breadth of the categorical taxonomy while categorical relationships will allow users to more quickly narrow in on a desired object.

A system of associations may be used to reflect the associations between objects themselves, the associations between the categories containing those objects as applied to the objects themselves, or alternative types of associations. These associations can be used to express relationships between categories or objects and if suitable can utilize weights. Those skilled in the art will realize that by employing numerical weights, the probability of one object or category appearing after another's selection may be controlled. A system of associations between objects might be represented using a directed graph such as the one in FIG. 10a.

Figure 10A:
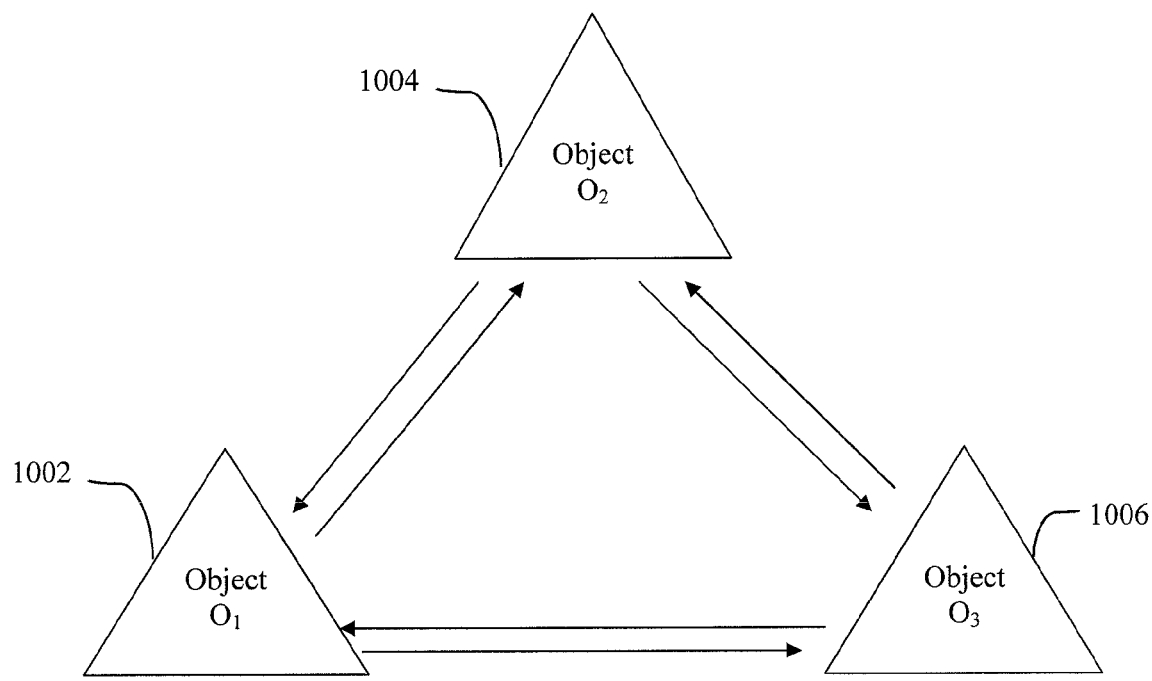
FIG. 10a shows a directed graph that shows the associations of three objects.
Figure 10B:
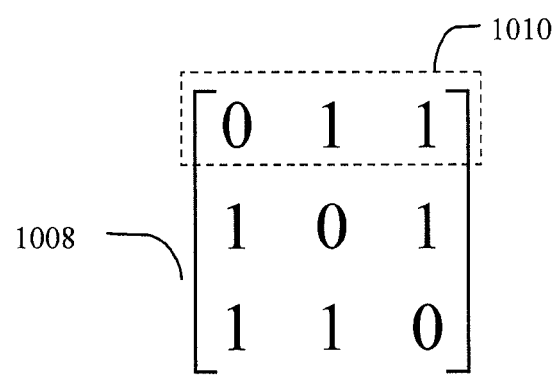
FIG. 10b shows the information of FIG. 10a expressed using an adjacency matrix.

FIG. 10a shows a complete directed graph as might be used to show the associations of three objects, $O_1$ 1002, $O_2$ 1004, and $O_3$ 1006 with one another. Those skilled in the art will realize that this same information might also be expressed using an adjacency matrix as seen in FIG. 10b. In FIG. 10b, each row of the adjacency matrix 1008 contains the associations for one object. For example, row 1 (1010) shows that object $O_1$ has associations to objects $O_2$ and $O_3$. Those skilled in the art will also understand that similar mechanisms and similar algorithms to those described below can be applied to systems of arbitrarily many objects.

Figure 7:
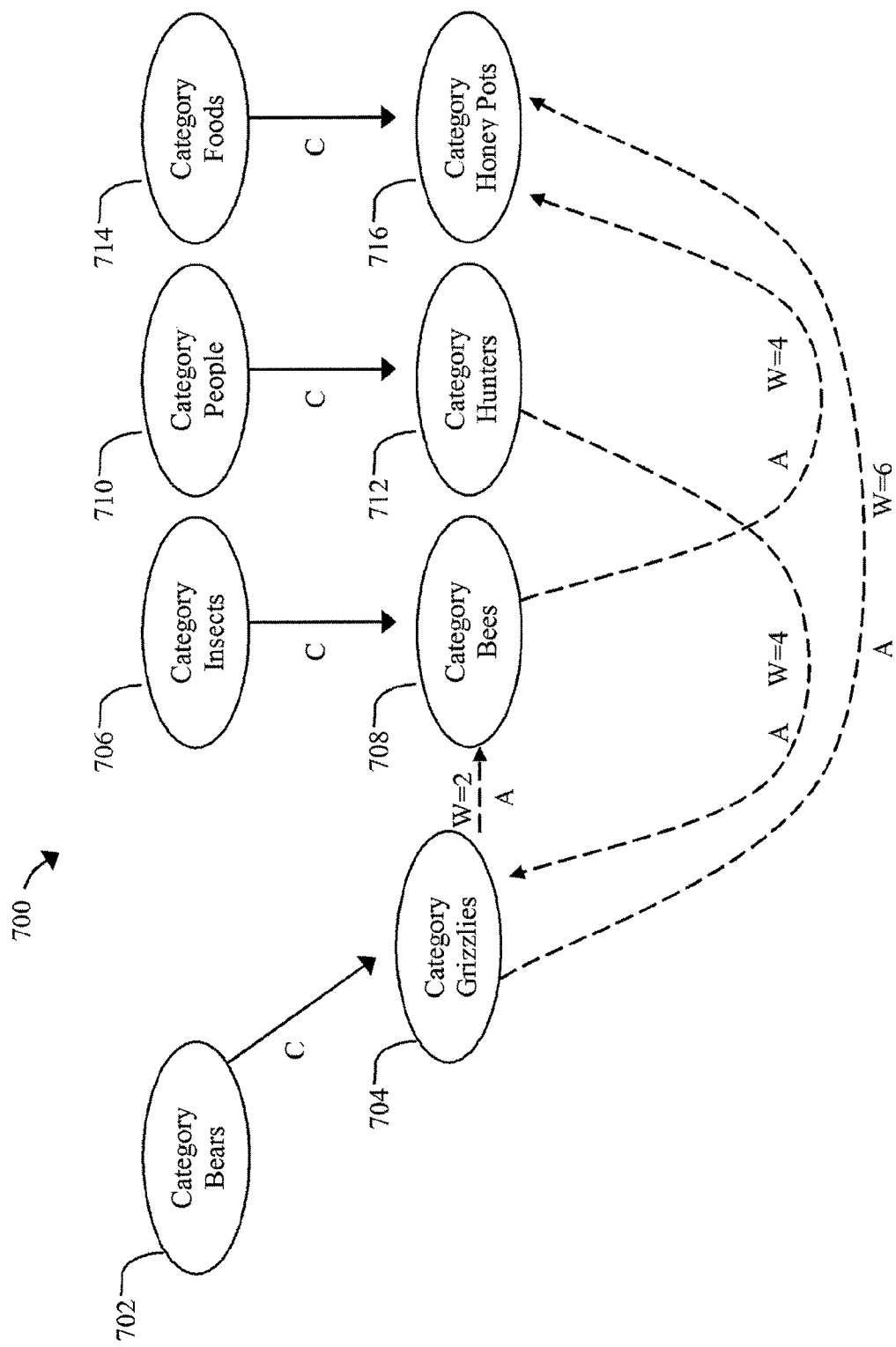
FIG. 7 shows an example directed graph that demonstrates the use of weights between categories as a component of a categorical taxonomy.
Figure 10C:
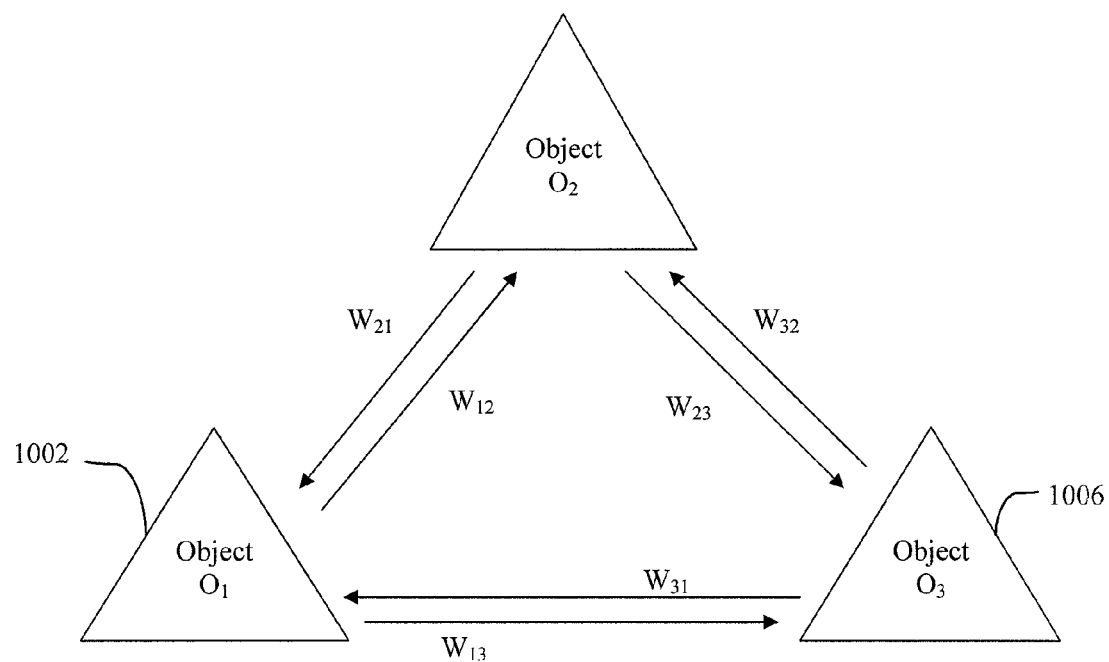
FIG. 10c shows a directed graph that shows weighted associations between three objects.
Figure 10D:
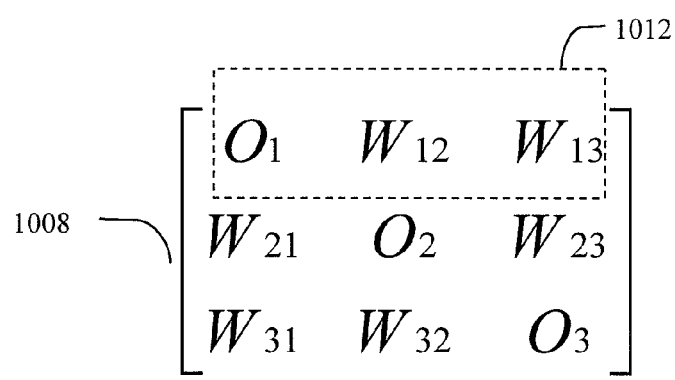
FIG. 10d shows the information of FIG. 10c expressed using an adjacency matrix.

In addition, a directed graph and/or its accompanying adjacency matrix might also include weights between objects, as shown in FIGS. 10c and 10d, respectively (see also FIG. 7). Such weights could be used as additional metrics in determining object selection. In FIG. 10d, each row of the adjacency matrix 1011 contains the associations and weights for one object. For example, row 1 (1012) shows that object $O_1$ has associations to object $O_2$ with a weight of $W_{12}$ and to $O_3$ with a weight of $W_{13}$.

Figure 4:
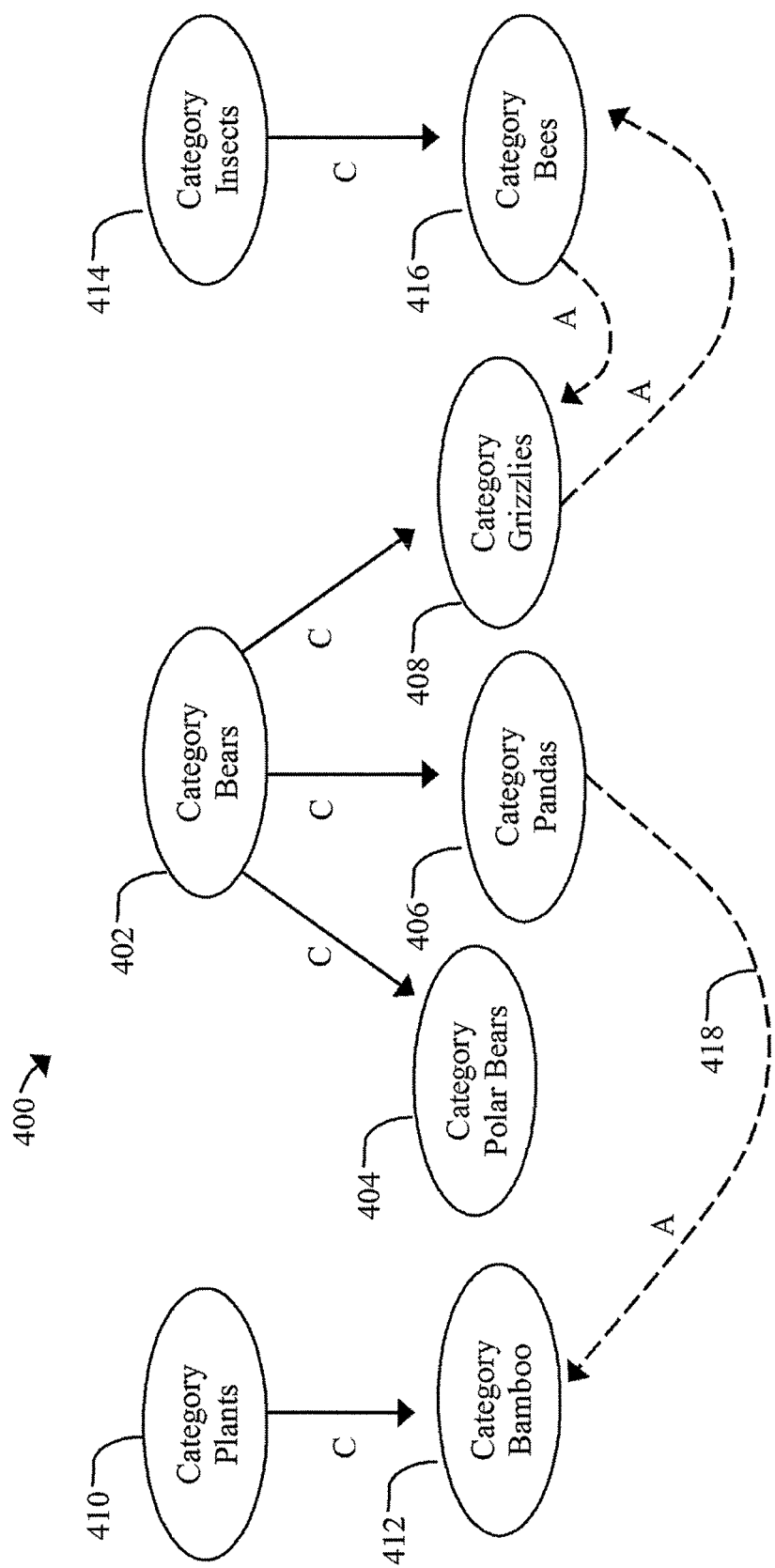
FIG. 4 shows a directed graph that expands on the notion of a categorical taxonomy by combining the categorical taxonomy with associations.

FIG. 4 shows a graph that expands on the notion of a categorical taxonomy by combining the categorical taxonomy with the concept of associations. An association such as association edge 418 between category pandas 406 and category bamboo 412 represents a selection criterion for selecting related categories or the objects in those categories.

Association edge 418 highlights one possible use of an association edge in a directed graph as shown in FIG. 4. Those skilled in the art will realize that a directed graph or another similar graph may utilize edges (either containment edges or association edges, see also FIG. 2) between its members or categories to store information about the relationships between those members or categories. Association edge 418 (by convention indicated with an 'A') points to category bamboo 412 as its target (by convention, the target of an edge is indicated using an arrow pointing towards the target). Association edge 418 also touches category pandas 406 but does not display an arrow pointing towards pandas 406, indicating that pandas 406 is its source. Hardware or software, such as the software used in one embodiment of the present invention, can examine the association edges in a directed graph or similar data structure to determine which categories or objects (the sources of those edges) associate with other categories or objects (the targets of those edges). Thus, association edges may be used in the selection of new objects and are used as such in an embodiment of the present invention.

Figure 5:
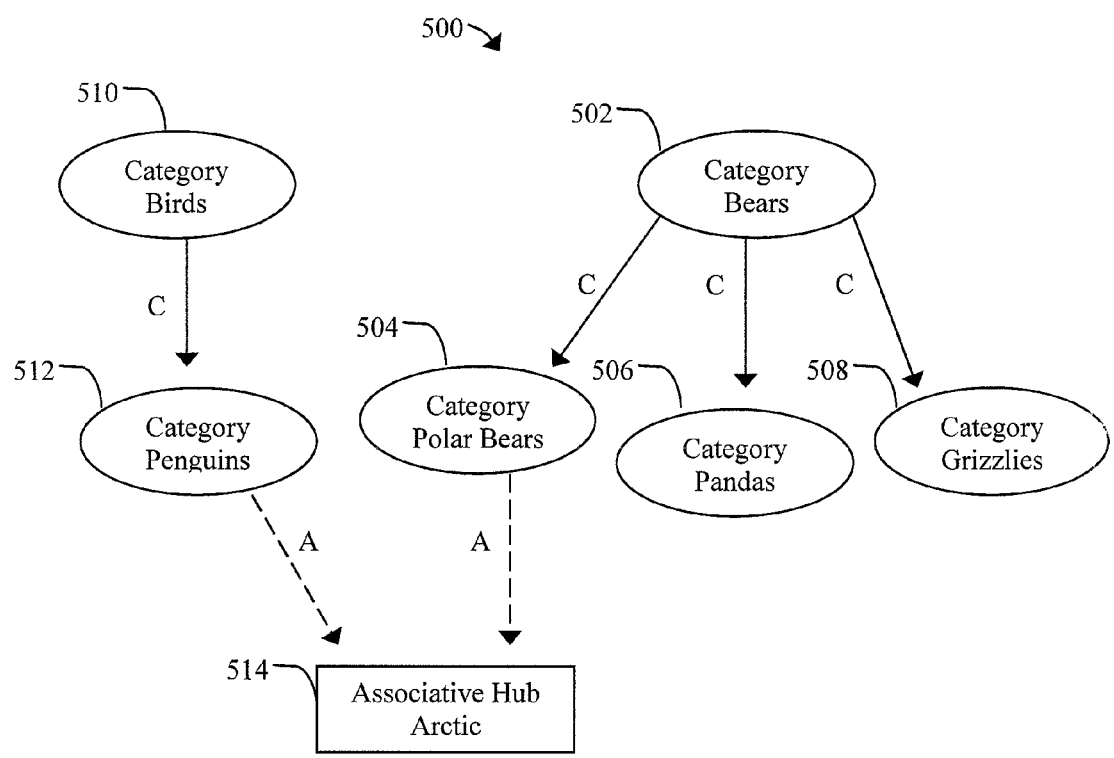
FIG. 5 shows another example directed graph that depicts another potential use for associations.

FIG. 5 shows another example graph that depicts another potential use for associations in a directed graph or categorical taxonomy. Category polar bears 504 and category penguins 512 both associate with the associative hub arctic 514. An associative hub may be defined in a data file or other element of information source 106, by information contained in user related information 108, or by inference from a recorded history of user actions 102. An associative hub may be used to determine the associations between objects. An examination of the categories and objects that associate with such a hub allows associations to be determined between those objects and categories. For example, because categories polar bears 504 and penguins 512 both associate with associative hub arctic 514, an association between polar bears 504 and penguins 512 may be assigned.

Figure 6:
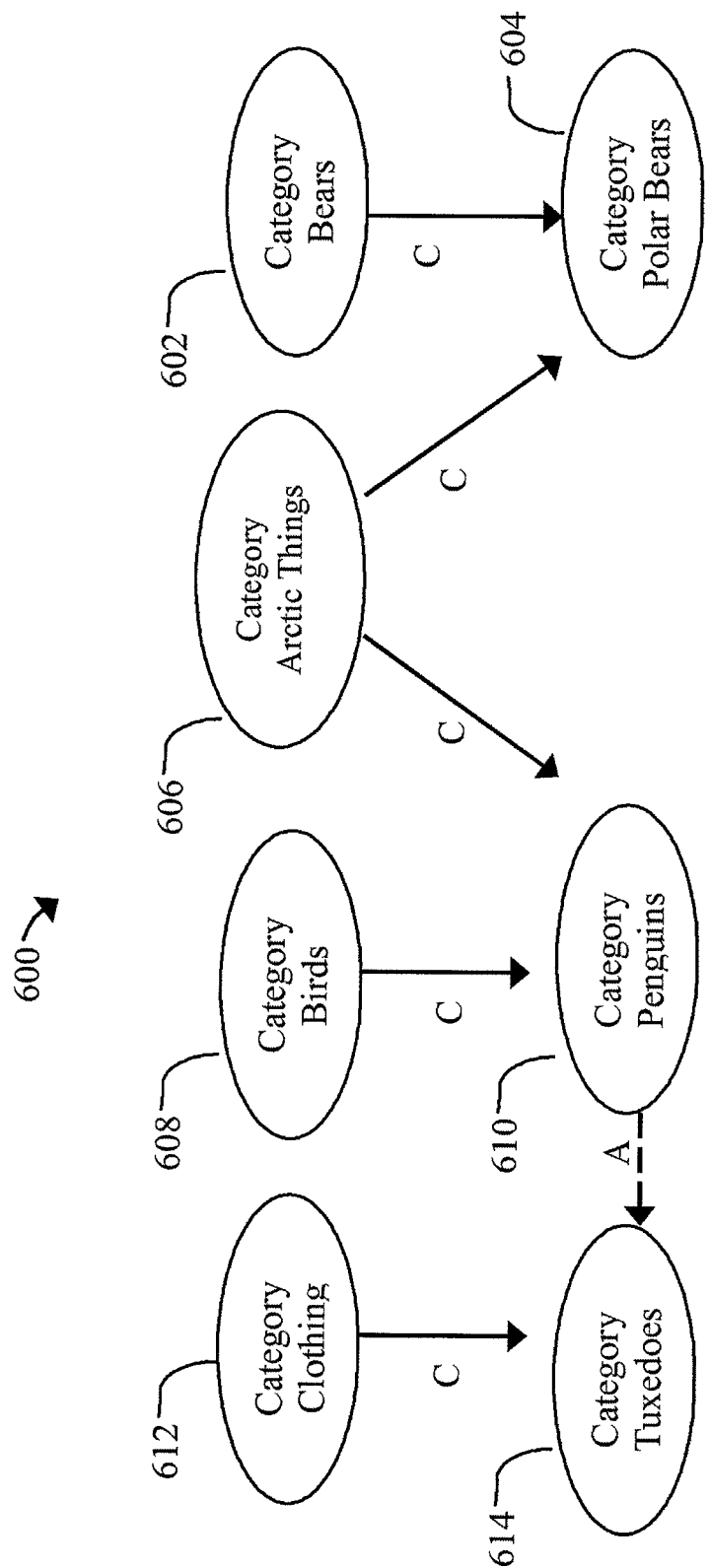
FIG. 6 shows an example directed graph that depicts objects contained by multiple categories.

FIG. 6 shows an example graph that depicts an alternative method of creating a categorical taxonomy whereby objects are contained by multiple categories. For example, category arctic things 606 contains polar bears 604 and penguins 610, which are also contained within bears 602 and birds 608, respectively. This system of categorization may also be used in object selection via the examination of shared categories.

FIG. 7 shows an example graph that demonstrates the use of weights between categories as a component of a categorical taxonomy (see also FIGS. 10c and 10d). Those skilled in the art will realize that a higher weight may indicate a stronger association between two objects. In FIG. 7, category grizzlies 704 associates with category bees 708 with a weight w=2, and grizzlies 704 associates with category honey pots 716 with a weight w=6.

Figure 8:
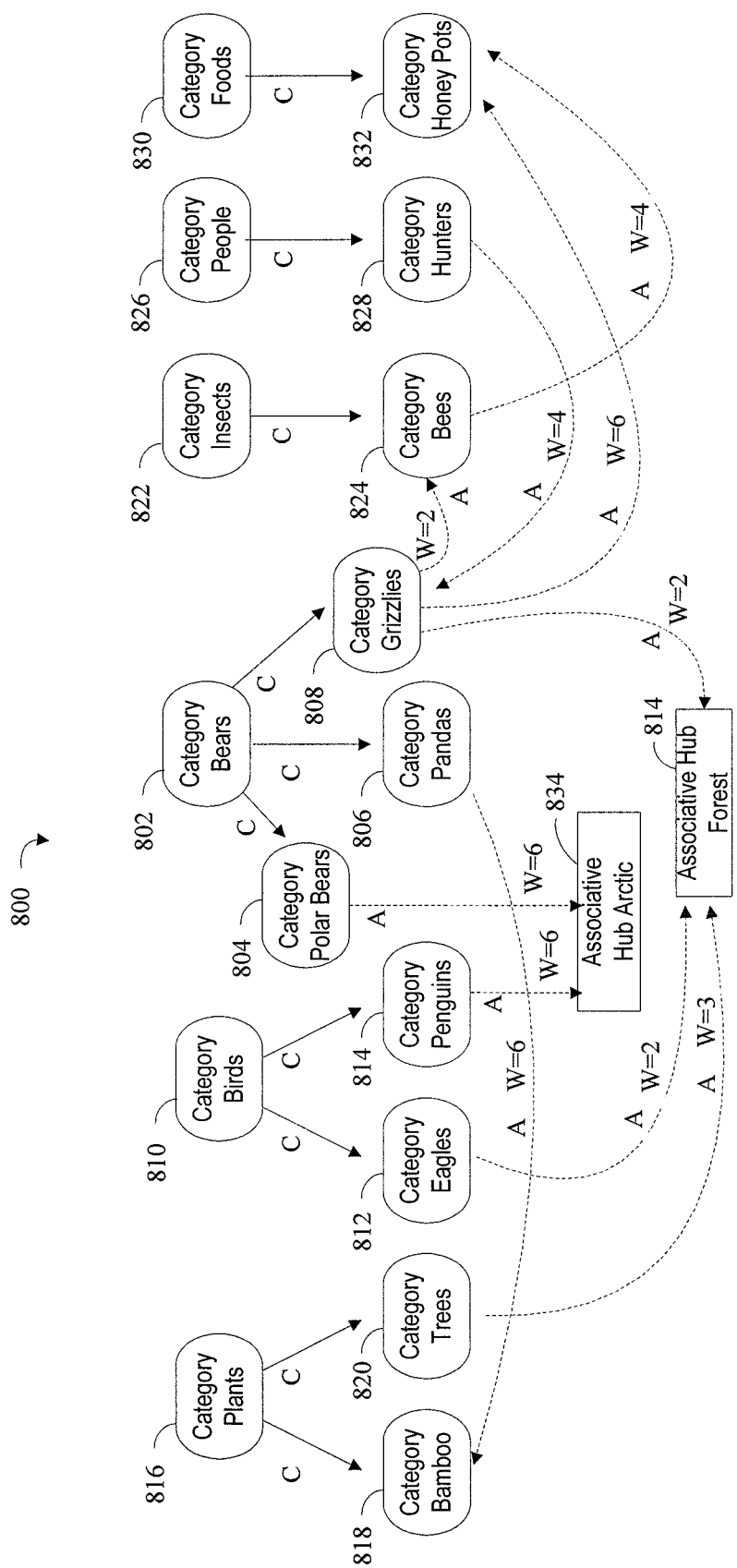
FIG. 8 shows an example directed graph that illustrates one way in which the examples illustrated in FIGS. 2-7 may be combined in accordance with an embodiment of the present invention.

FIG. 8 shows an example graph that illustrates one way in which the examples illustrated in FIGS. 2-7 may be combined in accordance with an embodiment of the present invention. Directed graph 800 demonstrates a categorical taxonomy that utilizes containment (for example, category birds 810 contains eagles 812 and penguins 814), association (for example, pandas 806 associates with bamboo 818), weighting (for example, grizzlies 808 associates with honey pots with a weight of 6), and associative hubs (for example, categories grizzlies 808, eagles 812, and trees 820 all associate with the associative hub forest 836). Thus, directed graph 800 illustrates one example in which one or more embodiments of the present invention may be used to aid in the selection of related objects or categories.

Figure 9A:
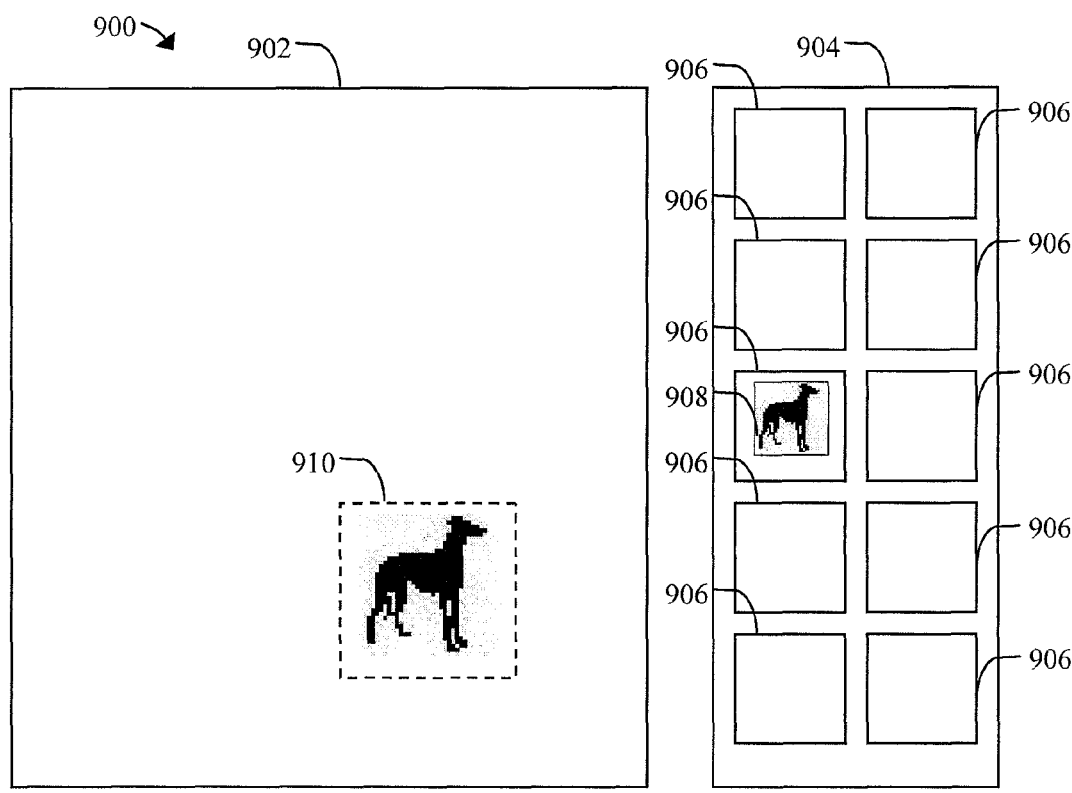
FIG. 9a shows an example user interface with which one or more embodiments of the present invention could function.

FIG. 9a shows an example user interface with which one or more embodiments of the present invention could function. Scene window 902 represents an area inside of which users may place graphical objects for constructing a scene by dragging them from window 904 using a pointing device. Selection window 904 represents an area inside of which thumbnail pictures of graphical objects might appear, each in an individual box 906. In FIG. 9a, a user has dragged thumbnail picture 908 of a dog from selection window 904 into the scene window 902, and the thumbnail picture 908 of a dog has become object 910, a graphical representation of a dog.

Figure 9B:
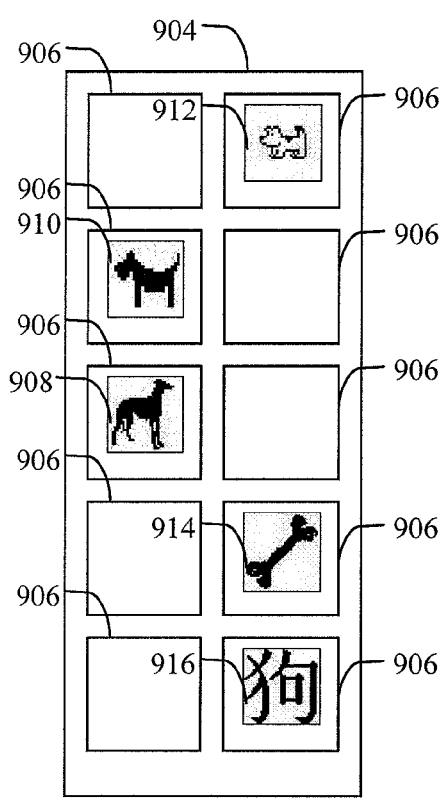
FIG. 9b extends the example of FIG. 9a with another example selection window.

FIG. 9b extends the example of FIG. 9a. After an object is dragged into window 902, thumbnail pictures in selection window 904 are automatically added, replaced, or removed by the system in accordance with application requirements. For example, since a picture of a dog 908 has been dragged into window 902, other related thumbnail pictures have been added to selection window 904, including thumbnail picture 912 of another dog, and thumbnail picture 914 of a bone.

Figure 9C:
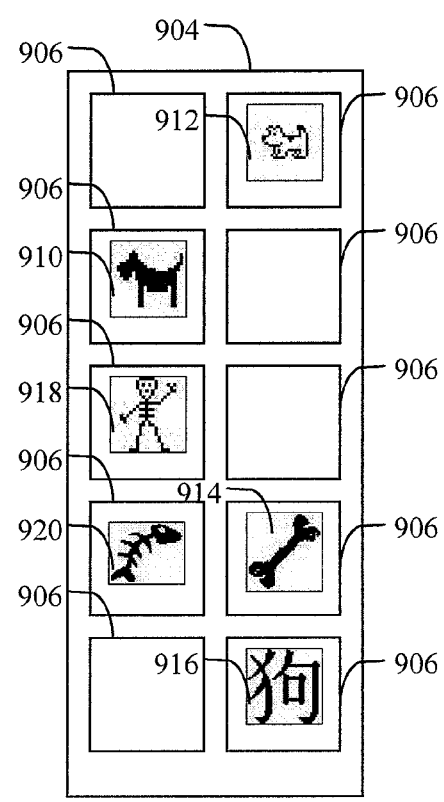
FIG. 9c continues the example of FIGS. 9a and 9b with another example selection window.

FIG. 9c continues the example of FIGS. 9a and 9b. In FIG. 9c, a thumbnail picture of bone 914 may have been selected by the user and placed into the scene window 902. Alternatively, the bone may have been clicked on but not placed into the scene window 902, or a picture of a bone already in the scene may have been clicked on. FIG. 9c shows an example selection window generated by the system in response to any of these events. As is shown in FIG. 9c, objects might not only be added to the selection window 904; they might also be removed or switched from the selection window 904 based upon selection criteria from the group including, but not limited to: elapsed time since last selection, previous user input, a directed association graph, an adjacency matrix, random influence under a probability distribution, and a measure of dissimilarity or diversity to a second group of objects. In FIG. 9c, thumbnail picture 920 of a fish skeleton has been added to the selection window 904, and thumbnail picture 918 of a human skeleton has been added in place of the original thumbnail picture of dog 908. Thumbnail picture 916 remains unchanged.

In order for those skilled in the art to understand the process by which a series of replacement objects are automatically determined for an object or a group of objects, the following paragraphs describe one method for doing so in an embodiment of the present invention.

In the example implementation of an embodiment of the present invention described below, a graphical scene construction software program allows users to create graphical scenes by adding and removing graphical objects from a graphical canvas. A variety of graphical objects are available to users and may be selected from an object palette, where selection of an object (e.g., by clicking an input pointer device within a predefined graphical region of the palette object) initiates a search query, implemented as a computer software algorithm, that may result in the replacement of one or more objects in the palette with new objects that are related to the first object. Relationships between objects may be established through categorical containment or through alternative types of associations that express some form of relationship between the two objects.

An object that replaces an existing palette object after a search query is initiated is referred to as a replacement object. The set of replacement objects $r_i$ for a search query is derived from a larger list of all possible replacement objects linked to the replacement object ($O_i$). The list of all possible replacement objects is referred to as a full object replacement set, $R_1$, where a unique full object replacement set $R_i$ is derived for each graphical object.

In one embodiment of the present invention, the full object replacement set $R_i$ may comprise a set of triples, where the triple $T_{ij}$ may include: a reference to a new replacement object, a weighting that indicates the relevance of the association with a second object, and a diversity region that generally specifies a broad region under which the object resides in the categorical taxonomy (e.g., is the object a person, scenery, fish, etc.).

The full replacement set $R_i$ may be stored in an object configuration file, where each object is assigned a unique file. This file may be a text file, binary file, XML file, an executable file, a script file, or other data format suitable for reading and writing by a computer software program. This file is initially computed before the user makes use of an embodiment of the present invention, but may also be periodically recomputed during use.

The weighting value in the replacement object triple $T_{ij}$ directly influences the probability that the object identified by triple $T_{ij}$ is selected during the object replacement selection process. For example, a graphical object may depict a golden retriever, which may associate with a second dog with assigned weight 1.0. The golden retriever may also associate with a cat with assigned weight 0.5. In this case a higher weighting signifies a stronger relationship; higher weightings increase the probability that the associated object is selected when the full replacement set $R_i$ is composed. Probability of selection may be a linear or non-linear monotonically increasing function of assigned weights.

While the full replacement set may include a large plurality of object/weight pairs (e.g., on the order of hundreds or thousands), the set may be significantly narrowed by computer software to reduce the number of palette objects that are replaced (e.g., three, four, or five) during a search query. The manner in which the culling occurs may be accomplished using a computer algorithm that picks some number of replacement objects using a function of weighting, a degree of randomness, and other metrics, including object diversity.

The computer algorithm may attempt to satisfy multiple criteria during replacement object selection, for example, criteria including the following:

Objects from related containment categories are picked as part of the replacement set during the search query. Strongly related items (e.g., dog to dog) are picked more often than loosely related items (e.g., dog to cow).

Objects from associated categories are picked as part of the replacement set during the search query (e.g., dog to bone). The recent history of user selections may be used to influence the degree to which strongly taxonomically related objects versus loosely taxonomically related but strongly associatively related objects are picked or weighted for the replacement set.

The object palette remains balanced in terms of diversity regions. In other words, the palette does not become overpopulated by a specific diversity region or major sub-tree of the taxonomy tree (e.g., animals).

Figure 12:
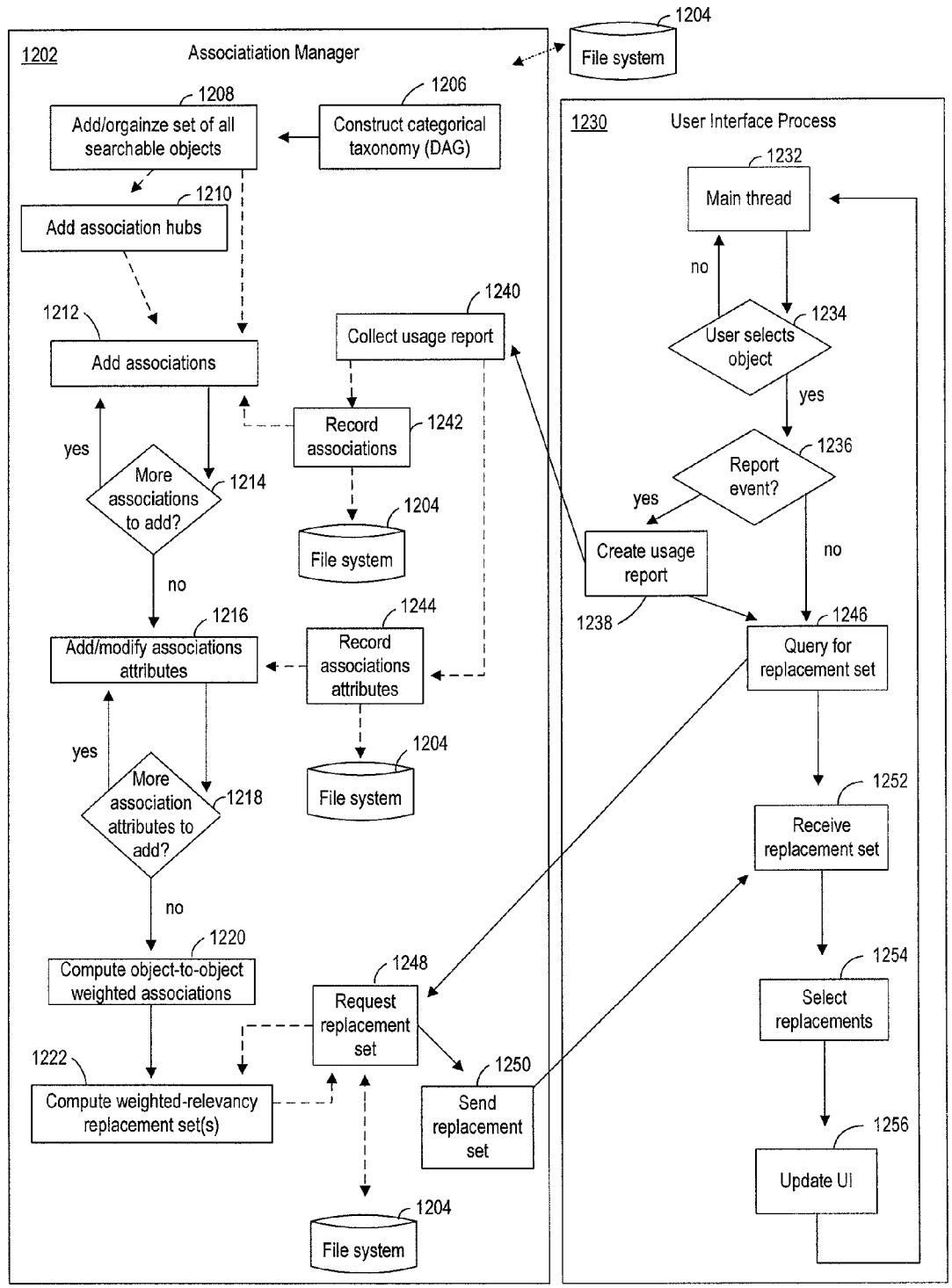
FIG. 12 is a flowchart that shows an example flowchart for computing a full replacement set.

In an embodiment of the present invention, an Association Manager 1202 may compute a full replacement set $R_i$ using the process illustrated in FIG. 12. Association Manager 1202 begins by constructing a categorical taxonomy in step 1206. This construction may utilize data from file system 1204 (which may be part of Information Source 106), wherein taxonomical or other categorical information may be stored in a one or more text file, binary file, XML file, executable file, script, or other data format suitable for reading and parsing by a computer software program. Contents of the files may be created or modified through both manual and automated processes. The construction may also produce a list of associations and association attributes to be used in steps 1212 through 1218.

In step 1208, Association Manager 1202 relates the full set of objects that can be searched to the set of containment categories as organized in step 1206. This construction may utilize data from file system 1204, wherein object and object categorization information may be stored in a one or more text file, binary file, XML file, executable file, script, or other data format suitable for reading and parsing by a computer software program. Contents of the files may be created or modified through both manual and automated processes. The construction may also produce a list of associations and association attributes to be used in steps 1212 through 1218. In one embodiment, objects are associated with a single category within the graph; in other embodiments objects may associate with multiple categories.

Various embodiments of the present invention may or may not include step 1210. In an embodiment that includes step 1210, Association Manager 1202 may embellish the data structures it has created in step 1206 and step 1208 with a plurality of associative hubs. This construction may utilize data from file system 1204, wherein associative hub descriptive information may be stored in a one or more text file, binary file, XML file, executable file, script, or other data format suitable for reading and parsing by a computer software program. Contents of the files may be created or modified through both manual and automated processes. The construction may also produce a list of associations and association attributes to be used in steps 1212 through 1218.

In step 1212 and step 1214, Association Manager 1202 adds a plurality of associations to the data structures realized in the above described steps. Certain associations may have been recorded in lists in the above described construction steps. Other associations may be determined from data from file system 1204, wherein associative information may be stored in a one or more text file, binary file, XML file, executable file, script, or other data format suitable for reading and parsing by a computer software program. Contents of these files may be created or modified through both manual and automated processes. As described below, new associations may also be asynchronously added by later events that are triggered from an external process, e.g., from User Interface Process 1230, via step 1240.

In step 1216 and step 1218, Association Manager 1202 adds a plurality of attributes to each of the associations. Certain association attributes may have been recorded in lists in the above described construction steps. Other association attributes may be determined from data from file system 1204, wherein associative information may be stored in a one or more text file, binary file, XML file, executable file, script, or other data format suitable for reading and parsing by a computer software program. Contents of the files may be created or modified through both manual and automated processes. As described below, new association attributes may also be asynchronously added by later events that are triggered from an external process, e.g., from User Interface Process 1230, via step 1244.

The taxonomy, objects, associations, and associative hubs may be realized by Association Manager 1202 as a directed, cyclic or acyclic, graph in the processing of steps 1206 through 1220. Each vertex in the graph may represent a specific category in the taxonomy (e.g., dogs, people, fishermen, etc.), a specific associative hub, or a specific object. A plurality of directed graphs, or similar data structures, may be used to like effect, as will be appreciated by those skilled in the art. Various computer data structures for representing graphs are widely used and are commonly known by those with normal skill in the art of computer programming. Weighted edges may be added to the graph to connect vertices, and signify categorical containment (e.g., category dogs contains category poodles) and alternative associative relationships (e.g., category dogs associates with category bones). Categories may also be tagged with diversity regions, edges may be weighted to signify associative relevance, and other similar attributes may be attached to the various edges and vertices of the graph or graphs used to represent this system.

In step 1220, the Association Manager 1202 may add a first list to each object which describes the set of all categories in which the object is contained. This list may be established by starting at the specified, primary containment category of the object and traversing the taxonomy upwards by following incoming edges to their source vertex until a root category is reached (i.e., a category that is not contained within another category). For example, a puppy object may be contained in the following categories, listed in the order of specific to general: the puppy→puppies→dogs→animals→living things. Furthermore, Association Manager 1202 may add a list to every taxonomical category in the graph. Such a list may contain every object name (or other unique identifier such as object pointer or object reference) that is contained within the category.

In step 1220, Association Manager 1202 adds additional list properties to each object. A second list for each object may be populated by Association Manager 1202 with weights that specify the object's categorical containment relationship to every other object known to Association Manager 1202. The taxonomical containment weight may be considered as a weighting between two objects that reside in the same category in the taxonomy. The weighting value may be a function of the number of categories shared between two objects, the number of objects within each shared category, and other characteristics of the taxonomical system. Higher weightings may be assigned to smaller shared categories, the goal being to assign higher weightings when objects reside in more specialized categories. For example, two objects in a category named Dalmatians might be assigned a higher weighting than two objects in a category named dogs because the size of the Dogs category is larger than the more narrow Dalmatians category.

In step 1220, a third list for each object is populated with weights that specify the associative relationship to every other object known to Association Manager 1202. These weights may be derived as a function of the number of ways in which an object associates with another object, the weighting of the association between the two objects, numbers of objects in related taxonomical categories, and other characteristics of the taxonomical and associative systems and data structures.

In step 1220, Association Manager 1202 adds a fourth list for each object. The fourth list is populated with attributes that combine the associative and containment weights into a composite weighting that may be used in the computation of full replacement sets.

Each of the above data elements used in step 1220 may be pre-computed by Association Manager 1202 for a fixed set of objects with fixed relationships and stored in Information Source 106 in an embodiment of the present invention. Furthermore, for a fixed set of contexts in which the objects may be used, and for contexts in which the relative relevance, popularity, etc. of particular objects are known, such data sets may be factored and preconditioned for each such context by Association Manager 1202 and stored in Information Source 106. Furthermore, in embodiments in which sequences of User Actions 102 or evolutions of User-Related Information 108 are used to influence and evolve object associations over time, both types of aforementioned pre-computations by Association Manager 1202 may still be used through scheduled tasks that are run from time to time by Association Manager 1202. Interactions of User Actions 102 and User-Related Information 108 with Association Manager 1202 are further described below.

Those skilled in the art will understand that the various data elements that have been described can be utilized by an Association Manager 1202 in various embodiments of the invention to compute weighted associations between objects in step 1220, and that the weighting of the associations can be computed so as to track the relevancies of one object to another. These weighted relevancies can be a function of the various data elements and attributes described above. It will also be understood that the weighted relevancies can be tailored for various contexts in which the objects are used. For example, in the context of an arctic setting, there may be a strong weighted relevance and hence association between bears and ice flows that is not present in another context such as a forest setting.

In step 1222, Association Manager 1202 compute for each object $O_i$ a full replacement set $R_i$. Such replacement sets may be partially or fully precomputed by Association Manager 1202 and delivered to other processes, e.g., User Interface Process 1230, on demand, or may be partially or fully constructed on such demand, e.g. from step 1248.

FIG. 12 also shows how a second process interacts with Association Manager 1202 in an embodiment of the invention. In the figure the second process is User Interface Process 1220. Those skilled in the art will understand that such a process may execute on a separate thread on the same machine or on a thread on a separate machine in a client-server configuration and in general may execute from a main user-interface thread 1232 as is frequently the case in the art.

At step 1234, User Interface Process 1230 detects whether the user has selected a graphical object of interest to the embodiment of the invention and that graphical object corresponds to an object known to Association Manager 1202. At step 1236, User Interface Process 1230 decides whether the selection of the object should be reported to Association Manager 1202. In alternative embodiments, usage reports may also be queued by User Interface Process 1230 for later, batched delivery to Association Manager 1202. In deciding whether to report the selection, User Interface Process 1230 may look at factors including which object was selected, the history of previously selected objects, user-related information 108, and conditions or parameters set by Association Manager 1202.

At step 1238, User Interface Process 1230 selects data for transmission to Association Manager 1202. Such data may include which object was selected, the history of previously selected objects, user-related information 108, and information about how the selected object has been used or manipulated. At step 1240, Association Manager 1202 may asynchronously collect the usage report sent by User Interface Process 1230. This may trigger Association Manager 1202 to record new associations at step 1242 and/or new association attributes at step 1244. Steps 1242 and 1244 may either record data for future processing by Association Manager 1202 by interfacing directly to file system 1204 or may trigger execution of step 1212 and/or step 1216 to immediately process the data. Immediate or delayed processing may be triggered according to aspects of an embodiment of the invention and/or because of the nature of a particular usage report.

At step 1246, User Interface Process 1230 queries Association Manager 1202 for a replacement set. The query will include an identifier for the selected object and may include additional information such as the context in which the object was selected, the history of previously selected objects, user-related information 108, and information about how the selected object has been used or manipulated. At step 1248, Association Manager 1202 receives the request from User Interface Process 1230 and determines an appropriate replacement set by retrieving precomputed results from file system 1204 and/or partially or fully computing the replacement set, on-demand, at step 1222. At step 1250, Association Manager 1202 packages the replacement set for transmission, possibly culling it for length to reduce bandwidth requirements, and transmits it to User Interface Process 1230.

At step 1252, User Interface Process 1230 receives the replacement set from Association Manager 1202. Those skilled in the art will understand that while FIG. 12 shows User Interface Process 1230 blocking until it receives a response from Association Manager 1202 to this query, this is only one embodiment, shown for clarity by example, and other embodiments will return control to main thread 1232 from step 1246 and asynchronously handle the reply from Association Manager 1202 at step 1252. At step 1254, User Interface Process 1230 selects replacement objects from the received replacement set. In this selection, it may use the various criteria described above. Finally, at step 1256, User Interface Process 1230 may update the user interface presented to the user and returns control to main thread 1232.

Figure 11:
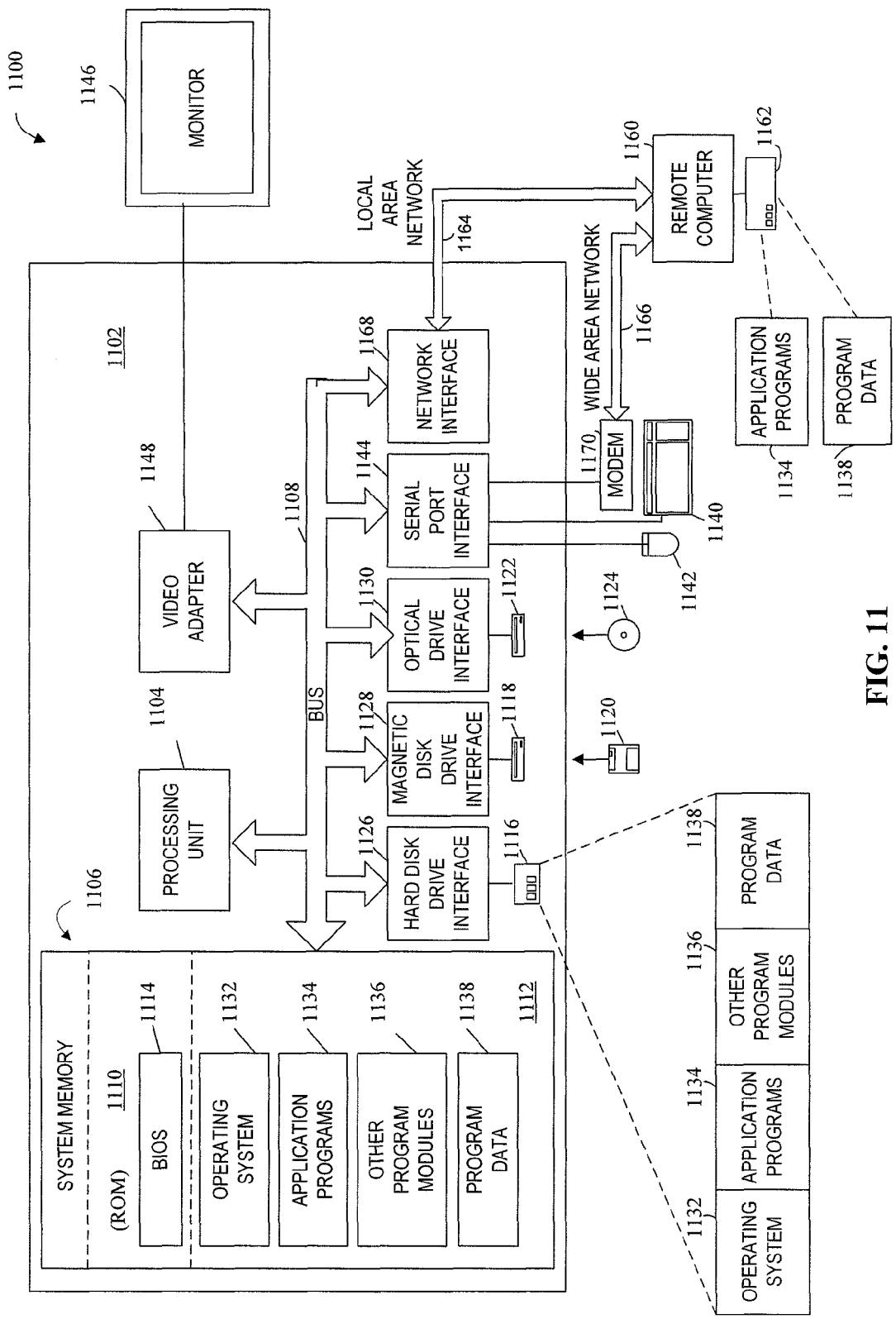
FIG. 11 shows and example computing environment in which the various embodiments of the present invention may be implemented.

FIG. 11 and the following discussion provide a brief, general description of a suitable computing environment 1100 in which the various embodiments of the present invention may be implemented. While the various embodiments of the invention have been described above in the general context of computer-executable instructions of a computer program that runs on a local computer and/or remote computer, those skilled in the art will recognize that embodiments may also be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the embodiments of the invention may also be practiced in distributed computing environments where certain tasks are performed by remote processing devices that are linked through a communications network. However, some, if not all, aspects of the embodiments of the invention may be practiced on stand-alone computers. In a distributed computing environment, program modules may be located in local and/or remote memory storage devices.

With reference to FIG. 11, an example system environment 1100 for implementing the various aspects of the invention includes a conventional computer 1102, including a processing unit 1104, a system memory 1106, and a system bus 1108 that couples various system components, including the system memory, to the processing unit 1104. The processing unit 1104 may be any commercially available or proprietary processor. In addition, the processing unit may be implemented as multi-processor formed of more than one processor, such as may be connected in parallel.

The system bus 1108 may be any of several types of bus structure including a memory bus or memory controller, a peripheral bus, and a local bus using any of a variety of conventional bus architectures such as PCI, VESA, Microchannel, ISA, and EISA, to name a few. The system memory 1106 includes read only memory (ROM) 1110 and random access memory (RAM) 1112. A basic input/output system (BIOS) 1114, containing the basic routines that help to transfer information between elements within the computer 1102, such as during start-up, is stored in ROM 1110.

The computer 1102 also may include, for example, a hard disk drive 1116, a magnetic disk drive 1118, e.g., to read from or write to a removable disk 1120, and an optical disk drive 1122, e.g., for reading from or writing to a CD-ROM disk 1124 or other optical media. The hard disk drive 1116, magnetic disk drive 1118, and optical disk drive 1122 are connected to the system bus 1108 by a hard disk drive interface 1126, a magnetic disk drive interface 1128, and an optical drive interface 1130, respectively. The drives 1116-1122 and their associated computer-readable media provide nonvolatile storage of data, data structures, computer-executable instructions, etc. for the computer 1102. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1100, and further that any such media may contain computer-executable instructions for performing the methods of the present invention.

A number of program modules may be stored in the drives 1116-1122 and RAM 1112, including an operating system 1132, one or more application programs 1134, other program modules 1136, and program data 1138. The operating system 1132 may be any suitable operating system or combination of operating systems. By way of example, the application programs 1134 and program modules 1136 can include an information searching scheme in accordance with an aspect of the present invention.

A user can enter commands and information into the computer 1102 through one or more user input devices, such as a keyboard 1140 and a pointing device (e.g., a mouse 1142). Other input devices (not shown) may include a microphone, a joystick, a game pad, a satellite dish, a wireless remote, a scanner, or the like. These and other input devices are often connected to the processing unit 1104 through a serial port interface 1144 that is coupled to the system bus 1108, but may be connected by other interfaces, such as a parallel port, a game port or a universal serial bus (USB). A monitor 1146 or other type of display device is also connected to the system bus 1108 via an interface, such as a video adapter 1148. In addition to the monitor 1146, the computer 1102 may include other peripheral output devices (not shown), such as speakers, printers, etc.

It is to be appreciated that the computer 1102 can operate in a networked environment using logical connections to one or more remote computers 1160. The remote computer 1160 may be a workstation, a server computer, a router, a peer device or other common network node, and typically includes many or all of the elements described relative to the computer 1102, although for purposes of brevity, only a memory storage device 1162 is illustrated in FIG. 11. The logical connections depicted in FIG. 11 can include a local area network (LAN) 1164 and a wide area network (WAN) 1166. Such networking environments are commonplace in offices, enterprise-wide computer networks, intranets and the Internet.

When used in a LAN networking environment, for example, the computer 1102 is connected to the local network 1164 through a network interface or adapter 1168. When used in a WAN networking environment, the computer 1102 typically includes a modem (e.g., telephone, DSL, cable, etc.) 1170, or is connected to a communications server on the LAN, or has other means for establishing communications over the WAN 1166, such as the Internet. The modem 1170, which can be internal or external relative to the computer 1102, is connected to the system bus 1108 via the serial port interface 1144. In a networked environment, program modules (including application programs 1134) and/or program data 1138 can be stored in the remote memory storage device 1162. It will be appreciated that the network connections shown are exemplary and other means (e.g., wired or wireless) of establishing a communications link between the computers 1102 and 1160 can be used when carrying out an aspect of the present invention.

In accordance with the practices of persons skilled in the art of computer programming, the present invention has been described with reference to acts and symbolic representations of operations that are performed by a computer, such as the computer 1102 or remote computer 1160, unless otherwise indicated. Such acts and operations are sometimes referred to as being computer-executed. It will be appreciated that the acts and symbolically represented operations include the manipulation by the processing unit 1104 of electrical signals representing data bits which causes a resulting transformation or reduction of the electrical signal representation, and the maintenance of data bits at memory locations in the memory system (including the system memory 1106, hard drive 1116, floppy disks 1120, CD-ROM 1124, and remote memory 1162) to thereby reconfigure or otherwise alter the computer system's operation, as well as other processing of signals. The memory locations where such data bits are maintained are physical locations that have particular electrical, magnetic, or optical properties corresponding to the data bits.

Figure 13:
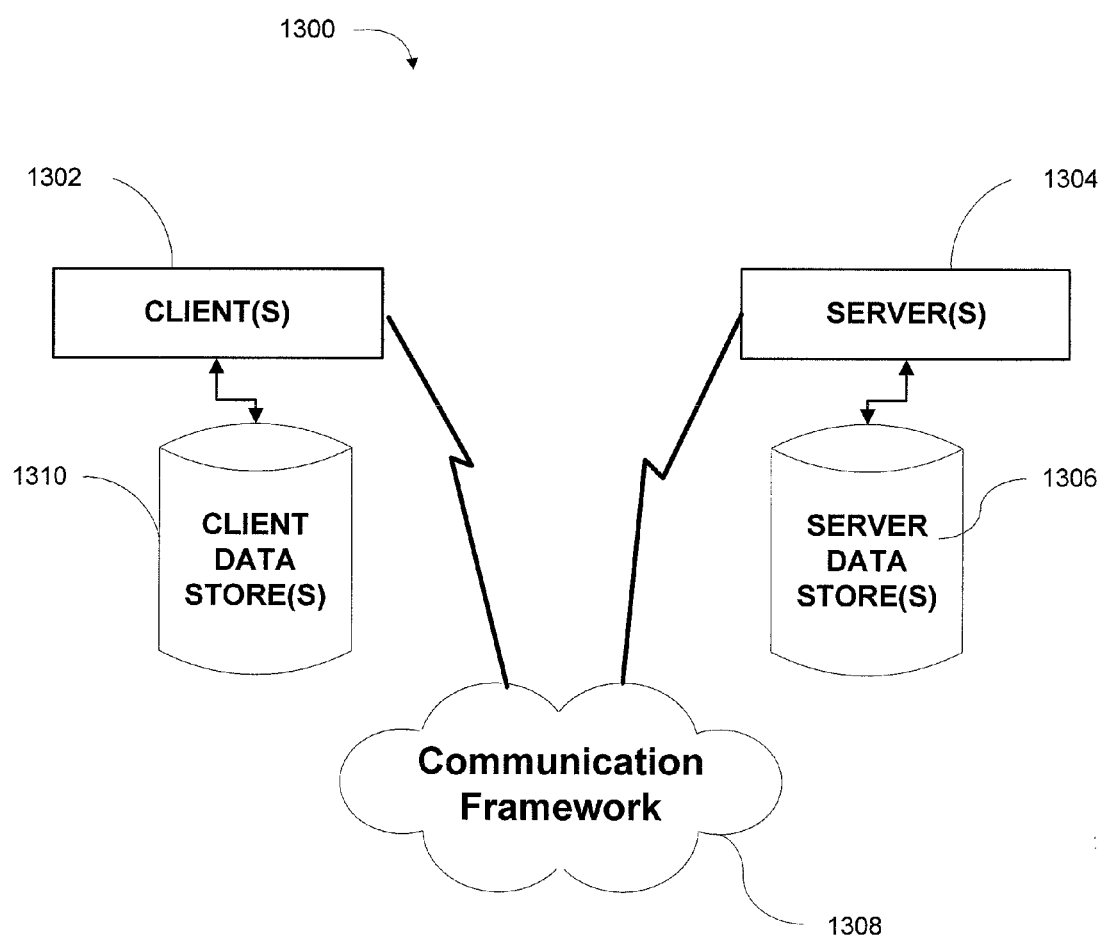
FIG. 13 is block diagram of another example computing environment in which the embodiments of the present invention may be deployed.

FIG. 13 is another block diagram of an example computing environment 1300 with which the present invention can interact. The system 1300 further illustrates a system that includes one or more client(s) 1302. The client(s) 1302 can be hardware and/or software (e.g., threads, processes, computing devices). The system 1300 also includes one or more server(s) 1304. The server(s) 1304 can also be hardware and/or software (e.g., threads, processes, computing devices). One possible communication between a client 1302 and a server 1304 may be in the form of a data packet adapted to be transmitted between two or more computer processes. The system 1300 includes a communication framework 1308 that can be employed to facilitate communications between the client(s) 1302 and the server(s) 1304. The client(s) 1302 are connected to one or more client data store(s) 1310 that can be employed to store information local to the client(s) 1302. Similarly, the server(s) 1304 are connected to one or more server data store(s) 1306 that can be employed to store information local to the server(s) 1304.

In one embodiment, a data packet transmitted between two or more computer components that facilitates searching is comprised of, at least in part, information relating to an automatically derived list of objects, derived, at least in part, from the results of at least one user-object interaction.

It is to be appreciated that the systems and/or methods described herein can be utilized in information search facilitating computer components and non-computer related components alike. Further, those skilled in the art will recognize that the systems and/or methods are employable in a vast array of electronic related technologies, including, but not limited to, computers, servers, vehicle-mounted electronic devices, and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While there have been shown and described and pointed out certain novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

What is claimed is:

1. A processor-based method for searching for electronic information, comprising:

presenting, for selection by a user and along a background scene, a first plurality of objects corresponding to the background scene, wherein the first plurality of objects is a first subset of a second plurality of objects organized by a plurality of containment categories in a data structure, wherein the data structure includes a plurality of associations defining relationships between two different ones of the plurality of containment categories and two objects in two different ones of the plurality of containment categories;

receiving a selection of one object of the first plurality of objects by the user and a placement of the one object of the first plurality of objects in first background scene by the user;

in response to receiving the selection and the placement of the one object of the first plurality of objects in the background scene by the user, selecting a second subset of the second plurality of objects in part as a function of (a) respective weighted relevance values for associations of the one object of the first plurality of objects to each of the second plurality of objects, and (b) respective weighted relevance values for associations of each of the second plurality of objects to the background scene, wherein the respective weighted relevance values for associations of the one object of the first plurality of objects to each of the second plurality of objects is determined based on (x) a number of containment categories shared between the one object and each of the second plurality of objects, and (y) a number of objects in each of the containment categories shared between the one object and each of the second plurality of objects; and presenting, for selection by the user and along the background scene, the second subset of the second plurality of objects.

2. The method of claim 1, wherein the presenting includes displaying an object in a form selected from the group consisting of an image, an icon, a photograph, a sketch, and a cartoon rendering.

3. The method of claim 1, wherein the function further includes a degree of randomness.

4. The method of claim 1, wherein the data structure includes least one associative hub, wherein each associative hub defines at least one of, an associative relationship between two or more of the plurality of containment categories, or an associative relationship between at least two objects in different ones of the plurality of containment categories, wherein each weighted relevance value is further a function of the at least one associative relationship of the at least one associative hub to the one object of the first plurality of objects.

5. The method of claim 1, wherein one or more of the weighted relevance values for associations of the one object of the first plurality of objects to each of the second plurality of objects is in part a function of a setting in which the user selection of the one object of the first plurality of objects was made.

6. The method of claim 1, wherein the data structure further includes data about previous object selections by a user made prior to selection of the one object of the first plurality of objects, wherein selection of the second subset is in part a function of the stored data about the previous object selections.

7. The method of claim 1, wherein the selecting of the second subset of the second plurality of objects is in part a function of third-party advertisement interests in selection of objects in the second subset.

8. The method of claim 1, wherein the function is further based on (c) previous object selections by one or more other users, and (d) previous object selections by the user.

9. An article of manufacture, comprising:
a non-transitory medium readable by a processing unit, the non-transitory medium having processor-executable instructions for searching for electronic information by:
presenting, for selection by a user and along a background scene, a first plurality of objects corresponding to the background scene, wherein the first plurality of objects is a first subset of a second plurality of objects organized by a plurality of containment categories in a data structure, wherein the data structure includes a plurality of associations defining relationships between two different ones of the plurality of containment categories and two objects in two different ones of the plurality of containment categories;
receiving a selection of one object of the first plurality of objects by the user and a placement of the one object of the first plurality of objects in first background scene by the user;
in response to receiving the selection and the placement of the one object of the first plurality of objects in the background scene by the user, selecting a second subset of the second plurality of objects in part as a function of (a) respective weighted relevance values for associations of the one object of the first plurality of objects to each of the second plurality of objects, (b) respective weighted relevance values for associations of each of the second plurality of objects to the background scene, wherein the respective weighted relevance values for associations of the one object of the first plurality of objects to each of the second plurality of objects is determined based on (x) a number of containment categories shared between the one object and each of the second plurality of objects, and (y) a number of objects in each of the containment categories shared between the one object and each of the second plurality of objects; and
presenting, for selection by the user and along the background scene, the second subset of the second plurality of objects.

10. The article of manufacture of claim 9, wherein the presenting includes displaying an object in a form selected from the group consisting of an image, an icon, a photograph, a sketch, and a cartoon rendering.

11. The article of manufacture of claim 9, wherein the function further includes a degree of randomness.

12. The article of manufacture of claim 9, wherein the data structure includes at least one associative hub, wherein each associative hub defines at least one of, an associative relationship between two or more of the plurality of containment categories, or an associative relationship between at least two objects in different ones of the plurality of containment categories, wherein each weighted relevance value is further a function of the at least one associative relationship of the at least one associative hub to the one object of the first plurality of objects.

13. The article of manufacture of claim 9, wherein one or more of the weighted relevance values for associations of the one object of the first plurality of objects to each of the second plurality of objects is in part a function of a setting in which the user selection of the one object of the first plurality of objects was made.

14. The article of manufacture of claim 9, wherein the data structure includes data about previous object selections by a user made prior to selection of the one object of the first plurality of objects, wherein selection of the second subset is in part a function of the stored data about the previous object selections.

15. The article of manufacture of claim 9, wherein the selecting of the second subset of the second plurality of objects is in part a function of third-party advertisement interests in selection of objects in the second subset.

16. The article of manufacture of claim 9, wherein the function is further based on (c) previous object selections by one or more other users, and (d) previous object selections by the user.

17. An apparatus for searching for electronic information, comprising:
a memory having processor-executable instructions; and
a processing unit executing the processor-executable instructions to:
present, for selection by a user and along a background scene, a first plurality of objects corresponding to the background scene, wherein the first plurality of objects is a first subset of a second plurality of objects organized by a plurality of containment categories in a data structure, wherein the data structure includes a plurality of associations defining relationships between two different ones of the plurality of containment categories and two objects in two different ones of the plurality of containment categories;
receive a selection of one object of the first plurality of objects by the user and a placement of the one object of the first plurality of objects in first background scene by the user;
in response to receiving the selection and the placement of the one object of the first plurality of objects in the background scene by the user, select a second subset of the second plurality of objects in part as a function of (a) respective weighted relevance values for associations of the one object of the first plurality of objects to each of the second plurality of objects, (b) respective weighted relevance values for associations of each of the second plurality of objects to the background scene, wherein the respective weighted relevance values for associations of the one object of the first plurality of objects to each of the second plurality of objects is determined based on (x) a number of containment categories shared between the one object and each of the second plurality of objects, and (y) a number of objects in each of the containment categories shared between the one object and each of the second plurality of objects; and present, for selection by the user and along the background scene, the second subset of the second plurality of objects.

18. The apparatus of claim 17, wherein the selecting of the second subset of the second plurality of objects is in part a function of third-party advertisement interests in selection of objects in the second subset.

19. The apparatus of claim 17, wherein the function further includes a degree of randomness.

20. The apparatus of claim 17, wherein the function is further based on (c) previous object selections by one or more other users, and (d) previous object selections by the user.

* * * * *